INVENTOR.
WILLIAM S. TANDLER
DAVID S. WALKER
BY
ATT'Y

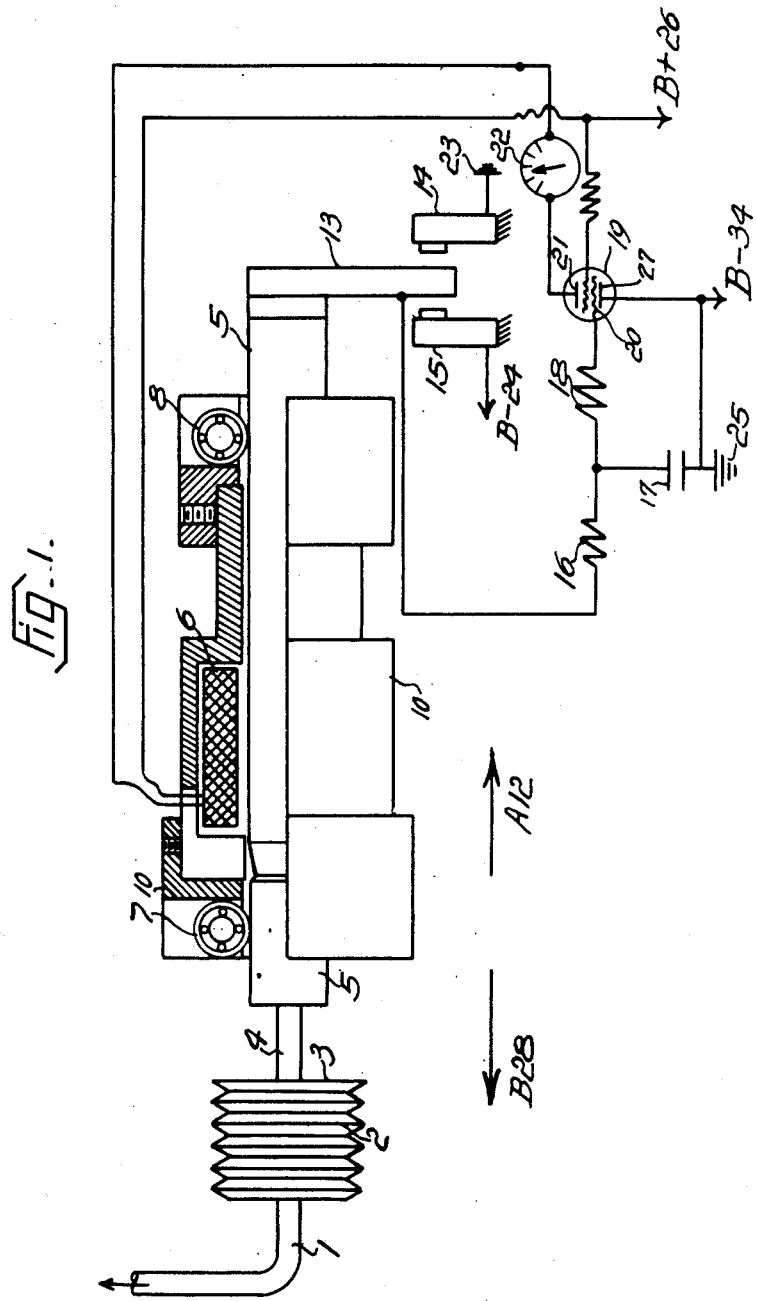

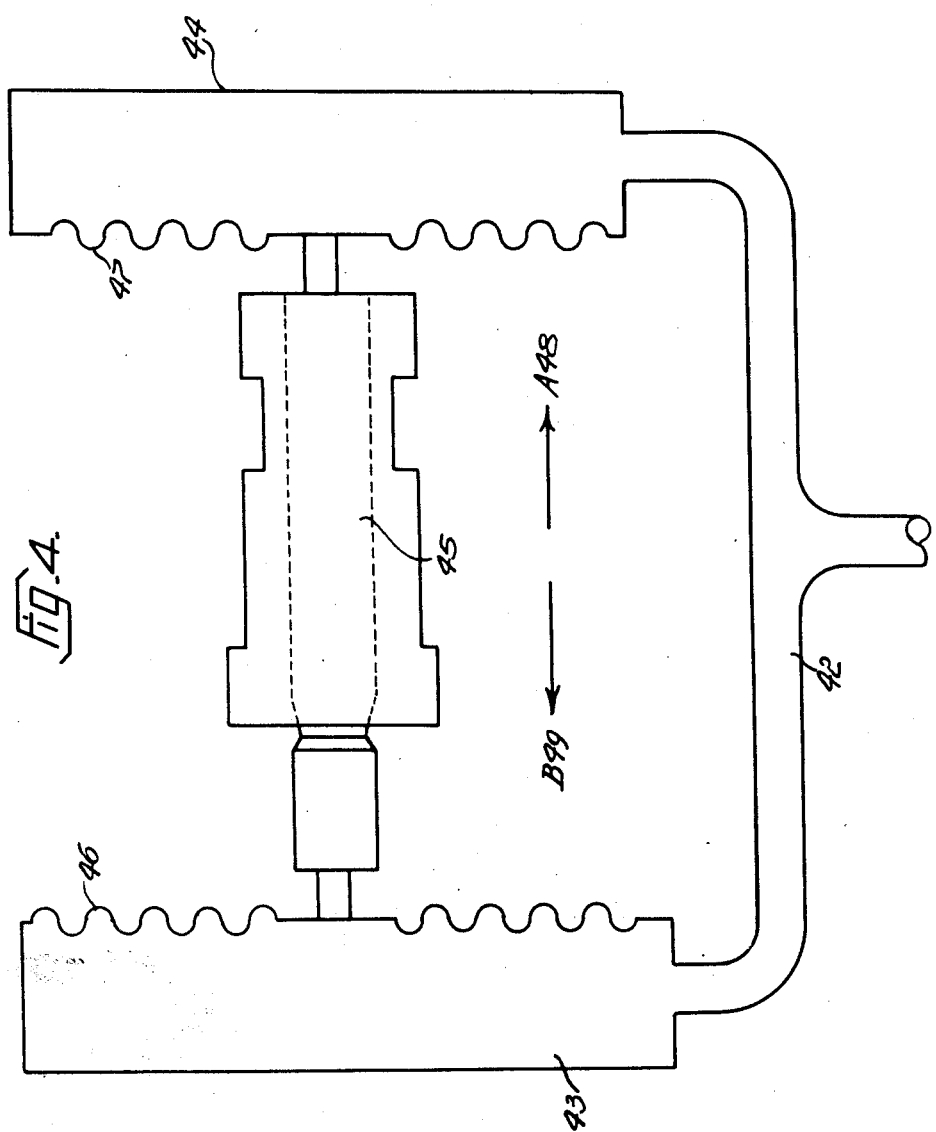

June 13, 1950 W. S. TANDLER ET AL 2,511,752
PRESSURE TELEMETER
Filed Jan. 12, 1945 4 Sheets-Sheet 4
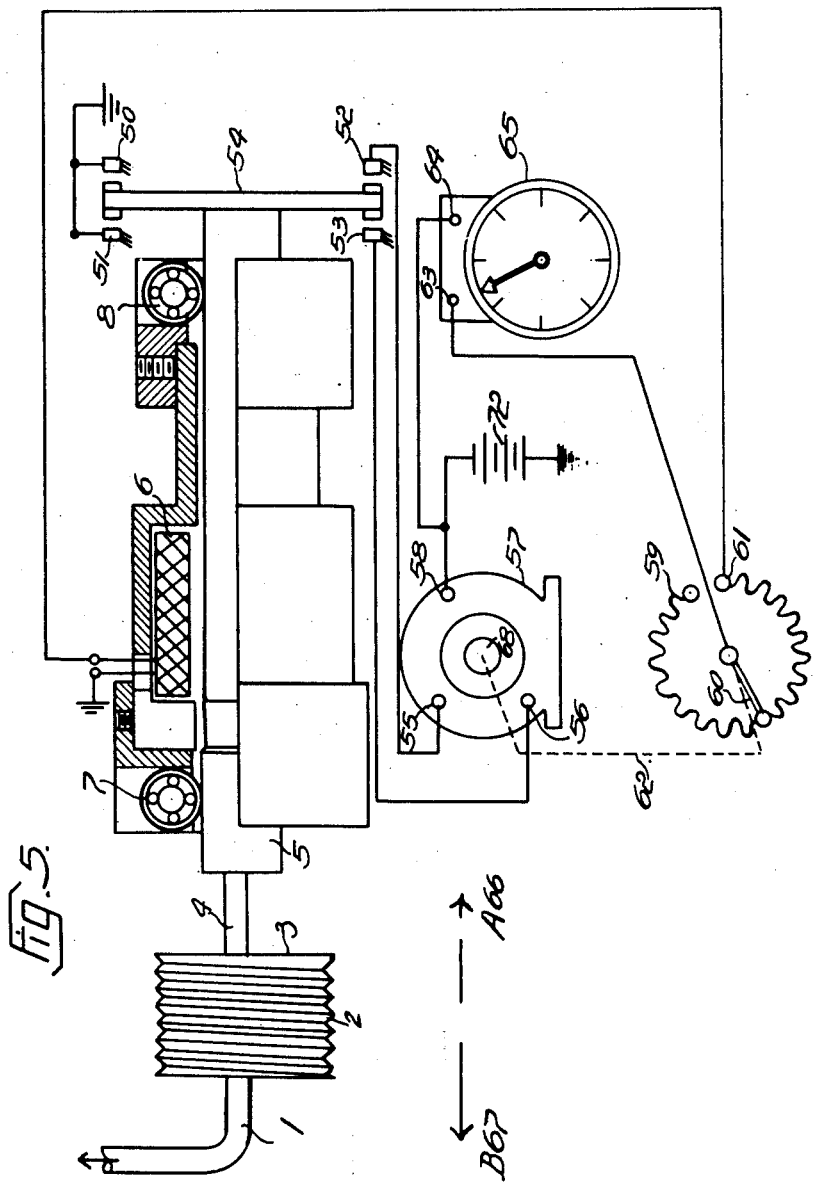
INVENTOR.
WILLIAM S. TANDLER
BY DAVID S. WALKER
ATT'Y Patented June 13, 1950

2,511,752

UNITED STATES PATENT OFFICE 2,511,752

PRESSURE TELEMETER

William S. Tandler and David S. Walker, New York, N. Y., assignors to Industrial Scientific Company, New York, N. Y.

Application January 12, 1945, Serial No. 572,548

1 Claim. (Cl. 73—398)

This invention relates to a pressure telemeter or a device for automatically measuring pressures as well as indicating and/or recording these pressures at a distance from the pressure source; it relates more particularly to pressure measuring devices which are able to measure, indicate, and/or record sensitively changes in fluid pressure of any intensity with a great degree of accuracy and regardless of the total pressure at the source.

An object of the invention is to provide an instrument which is particularly adapted to measure fine differentials of pressure.

Another object of the present invention is to provide automatic means of indicating or recording pressures at a point removed from the source of this pressure.

Still another object of this invention is to provide a pressure measuring and indicating or recording apparatus which will be sensitive to very slight changes in pressure.

An additional object of the present invention is to provide an instrument for measuring fluid pressures which will indicate and/or record at any desired place changes in pressure with extreme accuracy regardless of the magnitude and sensitivity of the pressure differential.

Other objects and advantages of the present invention will become apparent from the following description of several typical forms of the pressure telemeter embodying the present invention.

For purpose of illustration the invention will be described as embodied in a device for measuring fluid pressures in a pressure source, such as a storage tank located at a distance from the point of indication or recording of these pressures; however, the invention is not limited to this application but may be employed in the measurement of pressures under any circumstances and in any conceivable situation.

In accordance with the present invention, a pressure sensitive element operatively connected with the source of pressure to be measured is attached to the axially displaceable core of a restraining solenoid which is so designed that the distance traveled by the core of the solenoid acting here similarly to a plunger varies linearly in relation to the electromagnetic force induced within the solenoid. A change in pressure in the pressure source will result in a displacement of the solenoid plunger; by the displacement of the plunger an electrical circuit will be closed varying the energizing current flowing through the coil of the solenoid. The flow of current is caused to vary in such manner that the force induced in the solenoid plunger will cause the plunger to move in a direction opposite to the original displacement of the plunger or core. Thus the core of the solenoid will return to a neutral position upon each pressure change; the change in electrical current flow through the solenoid coil which is necessary to return the core to its neutral position is determined and its value will be an indication of the pressure to be recorded since the solenoid is being so designed that the force induced varies linearly with the current flow.

Should a condition arise whereby the solenoid employed does not have a linear force-current characteristic, but one in which force varies as the square of the current, provision is made for maintaining the accuracy of the device by measuring the power consumed by the coil instead of the current flowing through it as an indicator of the pressure change.

Precise control of the current flow through the solenoid coil in accordance with differentials of pressure in the pressure source, such as a storage tank, is obtained by the use of two electrical contactors, one at each end of the limit of travel of the solenoid plunger. A third electrical contactor is connected to the solenoid core to operate in conjunction therewith. As the solenoid core is displaced from its neutral position in response to a pressure change, this third contactor closes an electrical circuit through one or the other of the contactors located at the limits of the plunger movement. When contact is made in one direction the current flow through the solenoid coil is caused to increase; when contact is made at the other end of the travel limit of the solenoid core, current flow through the solenoid coil is caused to decrease.

Where extremely large total pressures are encountered, the sensitivity of the system would be greatly impaired should it be necessary to indicate, on one instrument the maximum as well as the minimum pressure. In order to meet such a situation, the invention includes an arrangement where a plurality of separate instruments are employed acting in conjunction with the pressure source, such as a storage tank, so that each instrument would operate as a result of a portion of the total pressure; therefore the difference between minimum and maximum indications on the indicating or recording instrument will be only a fraction of the total pressure of the pressure source.

Should the total pressure in the storage tank be of exceedingly great magnitude, the solenoid necessary to apply a reacting force would be so large as to impair its sensitivity through the introduction of excessive frictional forces and inertia.

To meet a condition of this type the invention includes an embodiment which operates on a basis of pressure differentials between two pressure membranes differing slightly in pressure influenced areas, the solenoid plunger operating between the two membranes. Thus, the solenoid coil need only develop a force large enough to counteract the force created by the difference in area of the two membranes or diaphragms and making the current flow through the coil entirely independent of the total pressure in the pressure source.

For a better understanding of the present invention reference may be had to the following description of the drawings illustrating typical embodiments of the invention in which:

Fig. 1 is a schematic vertical view partly in section of one embodiment of the instant pressure telemeter and of a diagram of the electrical circuit for use in conjunction therewith;

Fig. 4 is an elevation of an embodiment of the invention which is of particular usefulness when large pressures are to be measured or when extreme sensitivity of operation is required;

Fig. 5 is a schematical vertical view partly in section of an additional embodiment of the invention, where a motor driven rheostat is employed in place of an electronic circuit for controlling the current flowing through the coil of the solenoid.

Fig. 1 shows the structure of one embodiment of the present invention.

Figure 3:
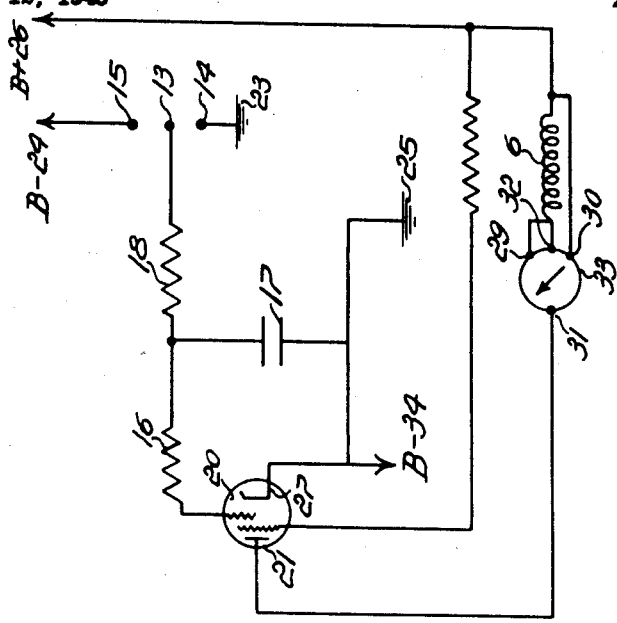
Fig. 3 is a schematic arrangement of the electrical circuit for use with solenoids having a squared force-current characteristic.

A tube 1 leads from the pressure source, not shown, to a pressure sensitive element composed of a bellows 2 provided at the one end opposite to its connection with the pressure source with a pressure sensitive diaphragm or membrane 3. Connected with diaphragm 3 as by means of shaft 4 is a core 5 of an electromagnetic restraining solenoid, which core has here the function of a plunger. The plunger is held by virtue of a force imparted to it as a result of the flow of an electric current through the windings of coil 6 in an initial neutral position against action of the pressure sensitive diaphragm 3. Plunger 5 is supported by two sets of ball bearings 7 and 8 in a cylindrical housing 10, one set being located at each end of the housing. The individual bearings of the two sets may be spaced at 120° around the periphery of core 6 so that the frictional force between the same and its support will offer negligible resistance to the reciprocative displacement of the solenoid core or plunger 5.

As previously mentioned, one end of plunger 5 is fastened to diaphragm 3. The other end has attached to it a contactor 13 arranged to move between contactors 14 and 15.

Contactor 14 is connected to ground 23 and contactor 15 is connected to the negative terminal B—24 of a D. C. power supply. Contactor 13 is connected to an electronic circuit composed of resistors 16 and 18, and condenser 17 connected between the resistors and ground 25. Resistor 18 is connected to the grid of a beam power tube 19, such as commercial type tube 6L6. The plate of tube 19 is connected through ammeter 22 and coil 6 to the positive terminal B+26 of the D. C. power supply; the negative terminal being denominated B—34.

In the position of the core shown in Fig. 1 which is called the initial neutral position, the pressure at the time being in the source of pressure is counteracted by the electro-magnetic force imparted to the solenoid; the system is at rest and the pressure at the time acting in the source of pressure is indicated by the ammeter.

Increase of pressure at the pressure source, not shown in the drawing, will result in an increase of pressure in the pressure sensitive chamber 2 connected to the pressure source by tube 1. This increase in pressure will cause an increase in the force acting upon membrane or diaphragm 3 resulting in a motion of the membrane in the direction shown by arrow A12; this motion of the membrane is transmitted to plunger 5. The motion of plunger 5 in the direction of arrow A12 will cause contactor 13 to close the electric circuit through contactor 14. The contact thus made between contactors 13 and 14 acts to connect condenser 17 to ground through resistor 16. The complete path now is ground 25 through condenser 17 through resistor 16 through contactors 13 and 14 in contact to ground 23. This action results in the discharge of condenser 17 applying a positive potential to grid 20 through resistor 18. The positive potential on the grid acts to increase the flow of electrons from cathode 27 through the tube to plate 21 which is at a positive potential greater than that of grid 20. This increase electron flow will be manifested by an increase in the plate current led out of the tube 19. Resistor 18 acts to reduce to a minimum the flow of current through the circuit of grid 20 so that the positive potential of the grid 20 does not interfere with the flow of electrons to plate 21.

The increase of plate current will result in an indication of larger magnitude of current in ammeter 22; the current also flows through the coil winding 6 of the solenoid resulting in an increase in the force applied to plunger 5, said force acting in the direction of the arrow B28. This force will continue to increase with the current increase until a return movement is caused of the core and contactor 13 in the direction of arrow B28 separating contactors 13 and 14; at this phase of the operation the increase in current ceases and the current through coil 6 will become stabilized. Thus the force acting on the plunger 5 of the solenoid set up as a result of the current flowing through the coil winding operates to counteract the force applied to the plunger by the change of pressure in the pressure element 2 and correspondingly in the pressure source.

The ammeter 22 indicates this current flowing through the solenoid coil, which current forms the basis for measuring the change of pressure; since the solenoid is so designed that the magnetomotive force varies linearly with the flow of current through the solenoid, the ammeter 21 may be calibrated to directly read the measure.

It is readily apparent that the wires connecting the instrument with the ammeter may be of any desired length, and thus the pressure will be indicated at any location regardless of distance from the source of pressure.

Should the pressure in the storage tank, not shown, be decreased, the decrease in pressure will also be transmitted to the pressure sensitive element 2 through tube 1; this will result in a reduction in the force acting on diaphragm 3 in the direction of arrow A12. Since the current in coil 6 is constant, the force acting on plunger 5 in direction B28 will now be greater than the force in the direction A12; thus the reduction of pressure in the storage tank will result in displacement of plunger 5 in the direction B28. This displacement will continue until contactor 13 contacts contactor 15. The closing of the circuit in this direction serves to connect resistor 16 to the negative terminal B–24 of the D. C. power supply. Thus a negative potential is imparted to the grid 20 of tube 19 through resistors 16 and 18. The negative potential on grid 20 will serve to impede the flow of electrons from cathode 27 to plate 21 and thus reduce the current flowing through the ammeter 22 and consequently the coil 6 from plate 21. The reduction of current in the coil 6 will reduce the magnetomotive force on the solenoid plunger and permit the diaphragm 3 to cause the plunger to return to its initial position shown in Fig. 1. The reduction of current will result in a lower indication on the ammeter 22, and thus an indication of the lowered pressure.

It is apparent that the above referred to indicating ammeter 22 could be readily replaced by a recording type instrument with no change in the operation of the device. Thus, either a visual indication or a continual record may be obtained of the pressures in the source of pressure.

In the above described embodiment of the present invention it was assumed that the solenoid possessed a linear force-current characteristic. However, should the force imparted to the plunger or core 5, as a result of the flow of current through the coil of the solenoid vary as the square of the current, it is possible to maintain a linear variation of pressure with the indicating instrument 22 by having the power consumed by the coil measured rather than the current flowing through it.

In this case the ammeter 22 shown in Fig. 1 is replaced by a wattmeter 33 (Fig. 3) in which terminals 29 and 30 are the connections of the potential coil of the wattmeter and 31 and 32 the connections to the current coil of the wattmeter. A schematic diagram of the electrical system showing the use of a wattmeter instead of an ammeter is shown in Fig. 3.

In this manner since the power in any electrical system varies as the square of the current, the force imparted to the plunger will have a linear variation with the power, and the indications on the instrument face will vary directly with changes in pressure of the source of pressure.

It is apparent from the description above that the magnitude of the current flowing through the solenoid coil will be dependent upon the total pressure at the pressure source. If a single ammeter or wattmeter scale were to be employed for the indication or recording of the maximum pressure and the minimum pressure, the sensitivity of the instrument to small differentials of pressure would be impaired. This difficulty would be eliminated by making the instrument operative over relatively small differentials of pressure. In this way the instrument can be calibrated between two limiting values of current rather than between zero and a maximum, thus permitting operation of the indicating instrument over a scale sufficiently small in range as to allow for indications of small pressure differentials.

Figure 2:
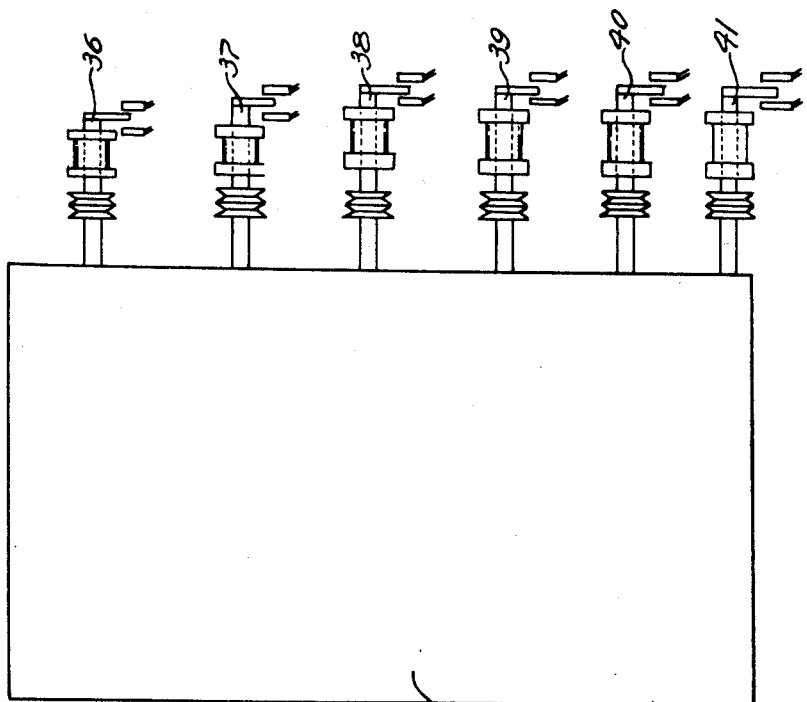
Fig. 2 is an elevation of a storage tank illustrating one means of maintaining high sensitivity of the pressure telemeter to slight pressure changes.

An embodiment of the invention for accomplishing this result is shown in Fig. 2 in which a series of individual measuring units 36, 37, 38, 39, 40, 41, equal to that shown in Figs. 1 and 2, are attached to vertical pressure tank 35 at intervals so that the pressure in the tank may be measured by that unit which is just below the surface of the liquid in the tank. By the operation of switches on the face of the indicating panel, not shown, each indicating instrument can be made operative as the level of the liquid comes within its sphere of influence. Thus, when the pressure head falls below unit 36, the instrument for unit 36 will read zero. Its control switch would then be opened and the switch for unit 37 closed, thus transferring the indication of pressure in the tank from the meter of unit 36 to the meter of unit 37.

In this manner it is possible to record or indicate minute changes in pressure regardless of the total pressure in the pressure source.

Since the total pressure in the pressure source acts upon the solenoid plunger, the solenoid must develop a total force equal to the total force in the pressure sensitive element. If great pressures are to be measured, the necessary size of the solenoid may become prohibitive.

Fig. 4 illustrates an embodiment of the invention where a fraction of the total pressure acts upon the solenoid.

The fluid from a pressure source, not shown, is fed through tube 42 to chambers of two pressure sensitive elements 43 and 44 of a pressure sensitive unit; the two sections which are provided with diaphragms 46, 47 are connected with these diaphragms to the opposite ends of the solenoid plunger 45. The pressure in the chambers 43 and 44 acts upon the corrugated pressure sensitive diaphragms 46 and 47. The pressure influenced area of diaphragm 47 is slightly smaller than that of diaphragm 46. Thus, for a given pressure transmitted through tube 42 which will result in setting up equivalent pressures in the chambers of elements 43 and 44, the force acting upon diaphragm 47 will always be slightly less than that acting upon diaphragm 46. Plunger 45 is fastened at either end to diaphragms 46 and 47 and is thus constrained to move between them as a result of the force differential between the two diaphragms. This force is counteracted by the magnetic force induced by the current flowing through the winding of the solenoid coil. The control action resulting from the displacement of the plunger is the same as has been previously described and a repetition is not deemed to be necessary.

It is apparent that the solenoid need only develop a force equal to the differential between the force acting on diaphragm 46 and that acting on diaphragm 47.

Any change in the pressure of the storage tank will be transmitted to the pressure chambers 43 and 44 through tube 42 and will result in a change in the force differential between diaphragms of elements 46 and 47. This change in the differential will result in motion of the plunger in either direction of arrow A48 or B49, depending upon whether the pressure change to be measured was an increase or a decrease.

A further embodiment of this invention is shown in Fig. 5.

Tube 1 connects pressure sensitive chamber 2 to a source of pressure, not shown; diaphragm 3 is associated with pressure chamber 2 and connected through shaft 4 with core or plunger 5 of a solenoid acted upon by electromagnetic forces due to the flow of an electric current through coil 6.

Electric current for the energization of coil 6 is provided by battery 72 through terminals 64 and 63 of D. C. ammeter 65, to the arm 60 of rheostat 59, through rheostat 59 to terminal 61 of the rheostat 59 through coil 6 and back to battery 72 through suitable ground connections.

The resistance of rheostat 59 is made variable by the rotation of arm 60 which is coupled by coupling 62 to shaft 68 of motor 57. Motor 57 is operated by battery 72 through motor terminal 58. The electrical circuit for the motor is completed through suitable ground connections and motor terminals 55 and 56 depending upon whether contacts 50 and 52 or contacts 51 and 53 are joined by contactor 54. When contactor 54 joins contacts 50 and 52, the motor circuit is completed through terminal 55 resulting in a counterclockwise rotation of motor 57 and consequently of rheostat arm 60. When contacts 51 and 53 are joined by means of contact 54, the motor circuit is completed through terminal 56 resulting in a clockwise direction of rotation of motor 57 and as a consequence of rheostat arm 60.

The operation of this embodiment of the invention will be more clearly understood from the following description and reference to Figure 5.

An increase of pressure at the pressure source, not shown, will be transmitted through tube 1 to pressure chamber 2 to cause an increase in the force acting on diaphragm 3 in a direction indicated by arrow A66. This force increase will be transmitted to plunger 5 resulting in the displacement of the same and consequently of contactor 54 fastened to plunger 5 in direction A66. This displacement of core 5 will result in contactor 54 making contact with contacts 50 and 52, resulting in the completion of an electric circuit through contactors 54, contact 52, terminal 55, motor 57, motor terminal 58, battery 72 and ground. The completion of this circuit will result in the rotation of motor 57 in a counterclockwise direction.

Since motor 57 is coupled to rheostat arm 60 through shaft 68 and coupling 62, any motion of motor 57 will be transmitted to rheostat arm 60. Thus, the counterclockwise rotation of motor shaft 68 will result in a counterclockwise rotation of arm 60. The rotation of rheostat arm 60 reduced the resistance of rheostat 59 causing an increase in the current flowing through the rheostat. Since the rheostat is part of a series circuit with the solenoid coil 6 and ammeter 65, the current flow through these will also be increased. The increased current in coil 6 will cause an increase in the magnetomotive force acting upon plunger 5 in the direction of arrow B67 and will thus serve to counteract the increased force on diaphragm 3, resulting in the displacement of core 5 in direction B67 until contactor 54 breaks its connection with contacts 50 and 52, thus opening the motor circuit and stopping the action. Since the ammeter 65 is connected in series with rheostat 59, battery 72 and coil 6, any increase in current in the coil will also pass through the ammeter resulting in a higher indication of current flow or pressure since the instrument may be calibrated to indicate pressure directly as described previously.

Should the pressure at the source decrease, this decrease would be transmitted through tube 1 to pressure chamber 2 resulting in a decrease in the force acting upon diaphragm 3. Since the magnetomotive force was balanced by the latter force acts to displace plunger 5 in the diaphragm 3, the reduction in the force acting in direction of arrow B67. This displacement carries contactor 54 towards contacts 51 and 53, closing the motor circuit through contacts 51 and 53, terminal 56 and battery 72 and ground.

The completion of the circuit in this direction will result in clockwise rotation of motor shaft 68. As described above, this motion is imparted to rheostat arm 60 resulting in its clockwise motion, thus increasing the resistance of rheostat 59.

This increased resistance results in a reduction of the current flowing through coil 6 and thus a reduction in the magnetomotive force acting on plunger 5 in direction of arrow B67. Plunger 5 thus moves in direction of arrow A66, breaking contact between contactor 54 and contacts 51 and 53 stopping the action. The reduction of the flow of current through rheostat 59 and coil 6 will result in a reduced reading of ammeter 65 and consequently a reduced pressure indication since the instrument may be calibrated to indicate pressures, as described previously.

The invention is herein described by way of example, and variations may be made of the invention without departure from the spirit and scope thereof, as it is to be understood that the same is not limited to the specific embodiments shown and described except as defined in the appended claim.

We claim:

A pressure telemeter comprising a pressure sensitive element adapted to be operatively connected with a source of pressure to be measured, an electrical source, a solenoid having its coil connected with said electrical source and a core surrounded by said coil connected with one end to said pressure sensitive element and adapted to be displaced by the same and by the magnetomotive force induced by said coil, means associated with said pressure sensitive element operative upon a change of pressure in said pressure source to displace said core from an initial position into one direction, a contactor fastened to the end of the core opposite to its end connected with said pressure sensitive element, a plurality of contactors located in the path of displacement of said core on both sides of said first contactor to be actuated by the same upon displacement of said core, means operative upon establishment of contact between said first contactor and one of the said plurality of contactors to vary the magnetomotive force induced by said coil to return said core to the initial position and means to indicate the electromagnetic force required for said return movement.

WILLIAM S. TANDLER.
DAVID S. WALKER.

REFERENCES CITED

The following references are of record in the file of this patent:

UNITED STATES PATENTS

| Number | Name | Date |
|---|---|---|
| 1,162,475 | Gibson | Nov. 30, 1915 |
| 1,191,416 | Gibson | July 18, 1916 |
| 2,112,682 | Ryder | Mar. 29, 1938 |
| 2,151,941 | Rydberg | Mar. 28, 1939 |
| 2,363,117 | Butler | Nov. 21, 1944 |
| 2,371,040 | Fisher et al. | Mar. 6, 1945 |